United States Patent [19]

Gerard

[11] Patent Number: 4,532,603
[45] Date of Patent: Jul. 30, 1985

[54] CHIRP TRANSFORM CORRELATOR

[75] Inventor: Henry M. Gerard, Capistrano Beach, Calif.

[73] Assignee: The United States of America as represented by the Secretary of the Army, Washington, D.C.

[21] Appl. No.: 473,467

[22] Filed: Mar. 9, 1983

[51] Int. Cl.³ .............................................. G06G 7/19
[52] U.S. Cl. .................................. 364/819; 364/827; 367/40
[58] Field of Search ............... 364/819, 826, 827, 576, 364/604, 724, 726; 367/39–42

[56] References Cited

U.S. PATENT DOCUMENTS

| 3,416,632 | 12/1968 | Bodine, Jr. | 367/41 X |
| 3,521,044 | 7/1970 | Costas | 364/819 X |
| 3,599,175 | 8/1971 | Hollingsworth et al. | 367/42 X |
| 3,961,172 | 6/1976 | Hutcheon | 364/819 X |
| 3,982,114 | 9/1976 | Hook | 364/819 X |
| 4,224,679 | 9/1980 | Nossen et al. | 364/819 X |

OTHER PUBLICATIONS

Jack et al., "Memory Correlator Using Combined SAW-CCD Components", *Ultrasonics Symposium Proceedings*, IEEE Cat. 77 CH1 264-1Su, Oct. 1977, pp. 961–964.

*Primary Examiner*—Jerry Smith
*Assistant Examiner*—Gary V. Harkcom
*Attorney, Agent, or Firm*—Anthony T. Lane; Jeremiah G. Murray; Edward Goldberg

[57] ABSTRACT

A chirp transform correlator having asynchronous operation is made possible by the use of a pair of paralleled signal processing channels to which the unknown signal to be correlated is applied. The two channels include sweeping local oscillators which are interlaced in timing so that any arbitrarily timed unknown input signal will be fully transformed by one or the other of the channels.

11 Claims, 4 Drawing Figures

CHIRP TRANSFORM CORRELATOR

The Government has rights in this invention pursuant to Contract No. DAAB07-78-C-3004.

BACKGROUND OF THE INVENTION

Modern radar and communications systems often employ waveforms significantly more complex than the simple modulation schemes of the past. This increased waveform complexity results from the need to operate in crowded and sometimes hostile signal environments. In radar applications, a need exists to separate and identify target echo signals deeply embedded in clutter. Radar systems are often provided with variable modulation formats for use in different tactical situations. These developments have lead to the need for programmable signal processors which can function as matched filters or cross-correlators for maximizing signal-to-noise ratios.

A chirp transform correlator can be used to perform both auto-correlation and cross-correlation. An example of the latter function would be the correlation of a noisy radar target echo signal with a reference signal comprising a sample of the radar's transmitted signal. Such correlators make use of the fact that correlation of two signals is the equivalent of taking the inverse Fourier transform of the product of the Fourier transform of one of the signals and the complex conjugate of the Fourier transform of the other signal. Fourier transformation can be conveniently implemented with the use of sweeping local oscillators in conjunction with chirp filters comprising state of the art devices such as reflective array compressor (RAC) filters.

Prior art chirp correlators have utilized a single signal processing channel to obtain the Fourier transform of the unknown signal. Such a correlator was built and tested to prove the concept of this correlator architecture, however such circuitry required that the timing and duration of the unknown input signal be coordinated with the timing of the sweeping local oscillator with which the input signal was mixed before application to the chirp filter. In most tactical situations, such a correlator must be asynchronous in that it must be capable of processing signals of arbitrary or random time of arrival. The present invention provides such asynchronous correlation.

SUMMARY OF THE INVENTION

The invention achieves asynchronous operation of a chirp transform correlator by providing a second signal processing channel in parallel with the first one and interlacing the timing of the sweeping local oscillators of these two data or signal channels so that any randomly arriving unknown signal with a duration equal to or less than half the period of the interlaced sweeping local oscillators will be fully transformed in the output of one or the other of these two signal processing channels. Cross talk between these channels is prevented by appropriate selection of the chirp filter and band pass filter parameters of the correlator.

The circuitry further includes a fixed local oscillator in the reference channel to obtain the complex conjugate of the Fourier transform of the reference signal and a bilinear multiplier for obtaining the product of the Fourier transform of the unknown signal which is obtained from the output of the aforementioned two signal channels and the aforementioned complex conjugate of the Fourier transform of the reference signal.

It is thus an object of the invention to provide an asynchronous chirp transform correlator (ACTC) which can accommodate data input signals of arbitrary or random timing, amplitudes, and phase codings.

A further object of the invention is to provide an asynchronous signal processor capable of auto-correlation or cross-correlation which uses linear chirp filters comprising reflective array compressor filters in conjunction with sweeping local oscillators to obtain the Fourier transforms of an unknown signal and a reference signal, and which uses a bilinear multiplier to obtain the product of the Fourier transform of the unknown signal and the complex conjugate of the Fourier transform of the reference signal.

A further object of the invention is to provide a chirp transform correlator in which asynchronous operation is permitted by the use of a pair of signal processing channels in which sweeping local oscillators operate at the same center frequency and frequency deviation but are interlaced in timing so that any arbitrarily timed input signal will be fully transformed by one or the other of said channels.

These and other objects and advantages of the invention will become apparent from the following detailed description and the drawings.

DETAILED DESCRIPTION OF A PREFERRED EMBODIMENT

The present invention was developed in response to a need for a programmable matched filter for pulse compression of large time-bandwidth (TB) product chirp radar waveforms. This matched filter utilizes chirp transform correlation with the use of surface acoustic wave (SAW) chirp filters. Pulse compression is achieved through cross-correlation of the radar target return with a reference waveform. The correlator processing is superior to conventional SAW matched filtering in several ways. For example, the chirp transform processor is capable of compressing a wide variety of chirp waveforms, high resolution pulse compression can be performed without high accuracy chirp radar waveforms, and sophisticated equalizations can be readily implemented for purpose of time-sidelobe suppression and interference rejection. The present correlator was developed to accommodate a family of radar waveforms having bandwidths up to 60 MHz and durations up to 60 microseconds. The chirp filters of correlators of this type must have time-bandwidth products of at least four times that of the signals to be processed. The aforementioned SAW filters of the RAC type are capable of providing these large TB products.

Figure 1:
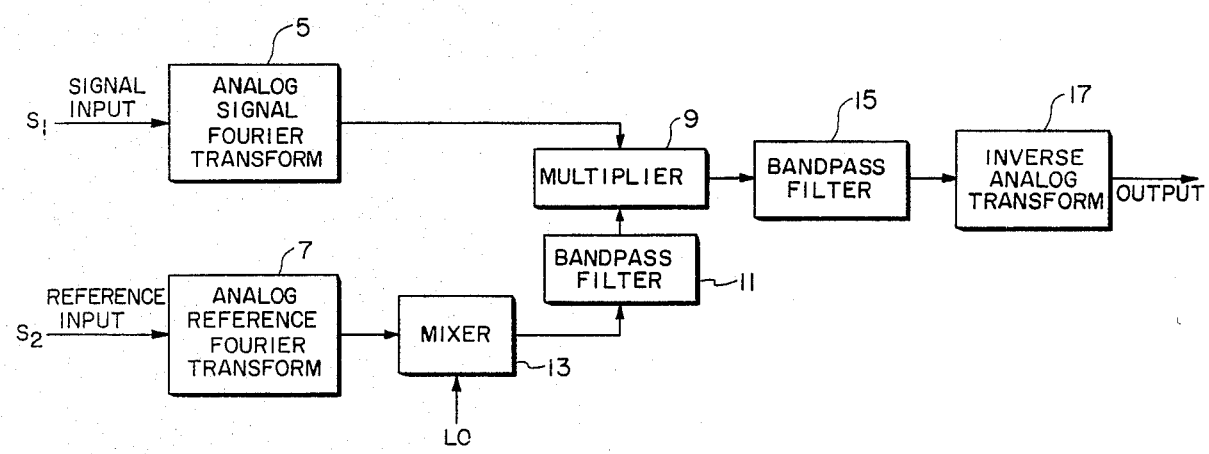
FIG. 1 is a simplified block diagram illustrating the principle of operation of a cross-correlator utilizing Fourier transforms.

The operation of the chirp transform correlators is based on the convolution theorem which states that the convolution of two signals is the equivalent to the inverse Fourier transform of the product of the Fourier transforms of each signal. To implement cross-correlation rather than convolution, one Fourier transform is simply replaced by its complex conjugate, which corresponds to time-reversal of that signal. This principle of operation of chirp correlators is illustrated in FIG. 1, in which the unknown signal S1 is applied to analog signal Fourier transformer 5 and the reference signal S2 to a similar analog reference Fourier transformer 7. The required complex conjugate of the transformed reference signal can be easily obtained by mixing the output of transformer 7 with a fixed local oscillator signal, LO, in mixer 13 and selecting the difference frequency in the mixer output by means of bandpass filter 11. The transformed analog input signal from transformer 5 is applied to analog multiplier 9 together with the output from bandpass filter 11 which represents the complex conjugate of the transformed referenced signal. The difference frequency products in the output of the mutiplier are selected by bandpass filter 15 and are applied to inverse Fourier transformers 17, the output of which is the desired cross-correlation between the signals S1 and S2. If S1 and S2 are the same, the resulting output is the auto-correlation, or the matched filter response, of the signal.

Figure 2:
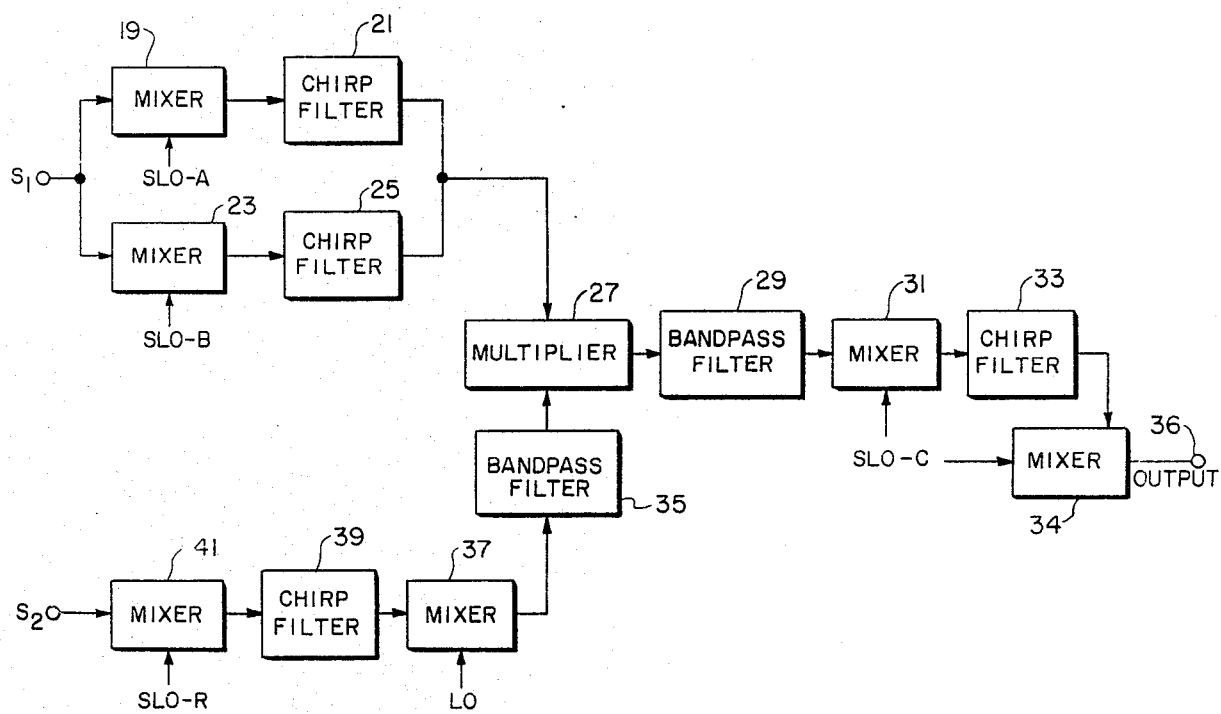
FIG. 2 is a block diagram of the correlator of the present invention.

The circuit of FIG. 2 shows a chirp transform correlator which operates on the principles illustrated in FIG. 1, but in addition provides for asynchronous correlation between the two input signals S1 and S2. The signal Fourier transform comprises a pair of channels. The first comprises mixer 19 and chirp filter 21. The second channel comprises the mixer 23 and chirp filter 25. The input signal S1 is applied to both mixers 19 and 23 and are there multiplied by or mixed with the output of one of a pair of sweeping local oscillators designated as SLO-A and SLO-B. These SLO signals are flat in amplitude and linearly frequency modulated, thus the outputs of these mixers will be a frequency modulated signal with the input signal S1 modulated thereon. The frequency sweep or deviation, center frequency and sweeping time of both the oscillators SLO-A and SLO-B are made the same but the timing of the sweeps are staggered or interlaced to permit asynchronous operation. The chirp filters 21 and 25 are identical and are preferably RAC type filters as explained above with chirp slopes equal to those of the SLOs but of opposite sign. Thus each of the two channels in the signal path are independently capable of forming the Fourier transform of the input signal. The outputs of the chirp filters are connected together to one input of analog multiplier 27. The sweeping times of SLO-A and SLO-B should be twice the duration of the maximum duration of the input signal S1.

The reference channel to which reference signal S2 is applied comprises mixer 41 to which sweeping local oscillator signal SLO-R is applied, and chirp filter 39, all of which function in the same way as the like elements of the signal channels to produce the Fourier transform of the reference signal. The sweep duration of SLO-R need not be as long as SLO-A and -B, and can be made equal to $T_c$, the maximum duration of the input signal S1. The chirp slopes of SLO-R and the filter 39 have the same relationship as do the similar circuit elements of the two signal channels. The transformed reference signal is applied to mixer 37 to accomplish the time inversion thereof. The fixed frequency signal LO forms the local oscillator input to mixer 37. The bandpass filter 35 selects the difference frequency between the two inputs of mixer 37 and the output thereof will thus be suitably frequency inverted to form the desired complex conjugate of the mixer input. This complex conjugate of the transformed reference signal is applied to the second input of multiplier 27. The bandpass filter 29 selects the difference frequency in the output of the multiplier and applies it to mixer 31, the second input of which is another sweeping local oscillator signal, SLO-C. The output of mixer 31 is applied to chirp filter 33. The output of chirp filter 33 is applied to mixer 34, the second input of which is SLO-C. The output 36 of mixer 34 is the cross-correlation of the input signals S1 and S2. All of the circuitry subsequent to the bandpass filter 29 constitutes the inverse analog transform circuitry.

Since the duration of the sweeps of SLO-A and SLO-B are twice that of the input signal duration, $T_c$, and since these SLOs are staggered or interlaced, any input signal S1 of duration $T_c$ or less will always fall completely within a chirp interval of one or the other of SLO-A or SLO-B. Thus an accurate Fourier transform of the input signal is generated regardless of its time of arrival relative to the timing or phase of the signal channel SLOs. Further, the bandpass filter 29, which selects the difference frequency in the output of multiplier 27, will automatically pass only the fully transformed input from one of the two signal channels, since the output of multiplier 27 related to the incompletely transformed input signal from the other signal channel falls outside the passband thereof.

The filter 29 will produce a continuous wave (CW) output when the input and reference signals S1 and S2 are identical and the frequency of this CW wave depends on the relative time of arrival of S1 and S2. Thus if the circuit is used to correlate radar returns, this CW frequency can be used as a measure of target range. Also, the compressed pulse output at 36 has a time delay relative to the reference signal input equal to the target range.

The aforementioned prior art correlator of this type which did not have the asynchronous capability of the present invention was similar to the circuit of FIG. 2 but had only a single channel in the input signal path. Thus the signal path would comprise for example only a single mixer and chirp filter in cascade.

Figure 3:
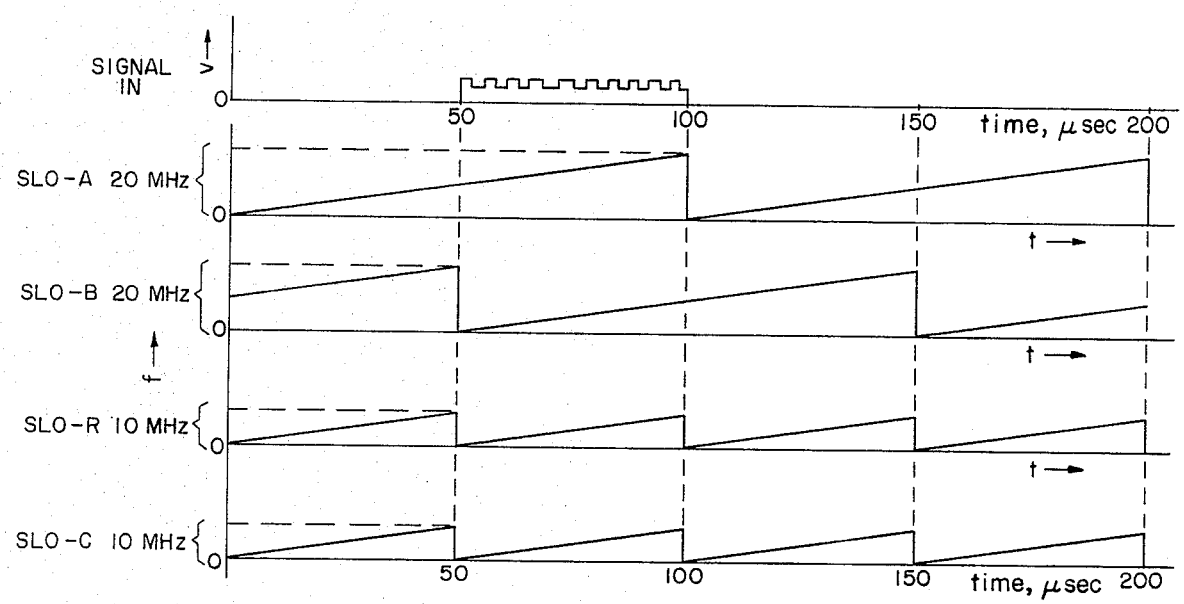
FIG. 3 shows waveforms in various parts of the circuit of FIG. 2.

FIG. 3 illustrates some of the waveforms of a synchronous correlator like that of FIG. 2 which was designed to accept input signals of up to 50 microseconds duration with bandwidths of up to 10 MHz. The first waveform of FIG. 3 shows an arbitrary input signal, S1, of 50 microseconds duration. The next waveform labelled as SLO-A shows how this sweeping local oscillator varies linearly in frequency with a deviation of 20 MHz, equal to twice the input signal of maximum bandwidth, and with a sweep time or period of 100 microseconds, or twice the maximum duration, $T_c$, of the input signal. The next waveform labelled SLO-B shows that this sweeping oscillator has the same 20 MHz deviation and 50 microsecond period, but its timing or phase is offset or interlaced relative to SLO-A in such a way that its peak frequency occurs half way through the sweep of SLO-A. The reference channel sweeping oscillator SLO-R and the inverse Fourier transformer oscillator, SLO-C, shown in the next two waveforms have deviations of 10 MHz, equal to the input signal bandwidth, and durations or periods of 50 microseconds, also equal to that of input signal S1. With these waveforms the two chirp filters 21 and 25 of the signal channels would both have bandwidths of three times S1, or 30 MHz and filter dispersive delays of three times the signal duration, $T_c$, so that the filters are properly matched to the characteristics of the SLOs A and B. Similarly, chirp filters 39 and 33 would have bandwidths of 20 MHz and dispersive delays of 100 microseconds, or $2T_c$.

The SLO chirp waveforms required for this circuit can conveniently be generated by a sweeping oscillator generator comprising chirp filters excited by impulses. Such an impulse-excited filter will de-compress the impulse to produce a linear FM sweep at its output. A pair of such filters to which impulses are alternately applied will produce interleaved or interlaced sweeping signals such as those required for SLOs A and B of FIG. 2. Frequency multiplication may be necessary to increase the frequency deviation of the outputs of such chirp filters. Also frequency translation by means of mixers may be necessary to obtain a desired center frequency for the sweeping local oscillator waveforms.

A key component of the circuit of FIG. 2 is the multiplier 27. If the overall circuit is to operate over a wide dynamic range wherein the two input signals S1 and S2 can vary greatly in amplitude and in phase characteristics, an ordinary multiplier such as a simple diode may not function reliably. In order for a multiplier to produce the desired modulation products of its input, at least one of its input signals must be of sufficient constant amplitude to drive the circuit element into a region of substantial non-linearity. A specialized multiplier which has the appropriate non-linearity over a large dynamic range is called a bilinear multiplier and it comprises a four-quadrant Gilbert transconductance multiplier. Further details of such Gilbert multipliers are available in an article by B. Gilbert in the "IEEE Transactions on Solid State Circuits", Vol. SC-3, pp 365–373, December 1968. Such a bilinear multiplier is preferred for the present ACTC for general applications, however for specialized applications, any conventional multiplier may be used. For example, if the reference signal S2 is a sample of the radar's transmitted signal and if this signal is essentially a flat, linear chirp, its Fourier transform would normally be of constant amplitude and large enough to drive any conventional multiplier forming circuit 27 into its non-linear region and thus efficiently produce the required modulation products for application to the succeeding circuitry.

As stated above, reflective array compressor (RAC) filters are ideally suited for use as chirp filters in both the present correlator and in the signal generators used to produce the required SLO waveforms. These RAC filters have the capability of producing the required precise linear frequency modulation dispersion characteristics with the required large time-bandwidth parameters. These RAC filters comprise a crystal substrate into which are etched an array of reflecting grooves, the spacing and depth of which determine the dispersive delay characteristics. The surface acoustic wave generated by the input transducer travels along the reflective gratings until it reaches a point where the groove spacing matches the acoustic wavelength. At this point, a portion of the wave is reflected by the slanted grooves to a second grating. The opposite slope of the grooves of the second grating reflect the wave back to the output transducer, where it is converted back to an electrical signal. The groove spacings are accurately varied along the grating length to produce a precise linear change in the reflective path as a function of frequency. Since the RAC filter characteristics are determined by mechanical type reflections from the etched grooves rather than by the electro-acoustic interactions used in conventional dispersive transducers, they exhibit considerably lower distortion effects as compared to the levels found in SAW chirp filters made with long interdigital transducers. RAC filters are essentially unaffected by spot defects in the reflecting arrays, and thus are much more tolerant to typical processing errors that lead to severe transducer defects in conventional SAW devices. The RAC's amplitude response is controlled by varying the depth of the reflecting grooves. Thus by tailoring the groove profile, it is possible to compensate for various loss effects, thereby producing a flat amplitude response over the operating bandwidth of the filter. Since the propagation path of the acoustic signal in a RAC line is folded, such a filter can achieve twice the delay available in a conventional SAW filter for a given crystal length.

Another important feature of RAC devices is that their phase errors can be compensated with the simple addition of a variable-width metal film between the two reflecting arrays. This slows down the surface wave and adds a phase delay, depending on the film width. These films can be individually tailored to compensate for the measured errors in a line to a few parts per million. The tight control of the frequency versus time characteristics and the inherent low phase errors of RAC devices is largely responsible for the successful application of chirp transform processing techniques in current wideband processing networks.

Figure 4:
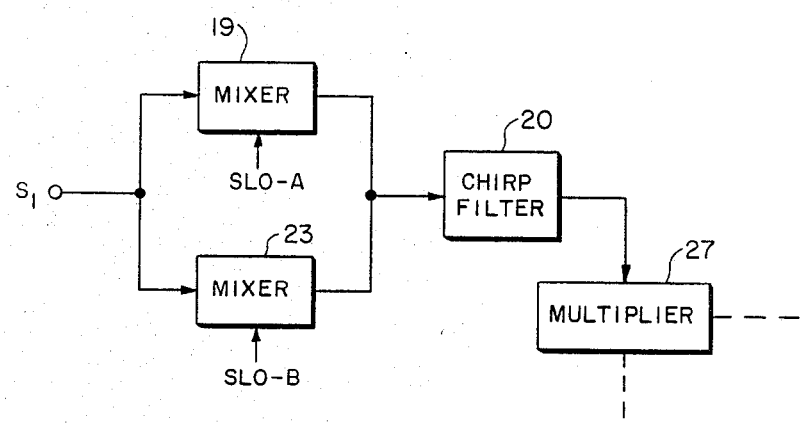
FIG. 4 shows a modification of the circuit of FIG. 2.

In the modification of FIG. 4, the circuit of FIG. 2 is simplified by using a single chirp filter in the signal channels. As shown, the outputs of the two mixers 19 and 23 are fed in parallel to a common chirp filter 20, which performs the functions of both of the filters 21 and 25 of FIG. 2. Since these chirp filters are linear devices, a single filter can simultaneously process two chirped signals from the two mixers without any crosstalk or interference. As noted above, the incompletely transformed signal from one of the mixers is removed through the action of bandpass filter 29.

While the invention has been described in connection with illustrative embodiments, obvious variations therein will occur to those skilled in the art without the exercise of invention, accordingly the invention should be limited only by the scope of the appended claims.

I claim:

1. An asynchronous chirp transform correlator, comprising, first circuit means to obtain the Fourier transform of an unknown signal S1, and a second circuit means to obtain the complex conjugate of the Fourier transform of a reference signal S2, third circuit means including a multiplier to which said Fourier transform of signal S1 and said complex conjugate of the Fourier transform of signal S2 are applied to obtain the product thereof, and further circuit means connected to the output of said multiplier to obtain the inverse Fourier transform of said product and provide an output which is the cross-correlation between said signals, and wherein said first circuit means includes a pair of channels each having a mixer and respective first input connection to receive said signal S1, a sweeping local oscillator connected to a respective second input of each said mixer and chirp filter means connected to the output of each said mixer, said sweeping local oscillators both being linearly swept in frequency over the same bandwidth but being interlaced or staggered in timing so that any randomly timed signal S1 of less than a given duration will be completely transformed on one or the other of said channels.

2. The correlator of claim 1 wherein said second circuit means includes a third mixer, a second chirp filter means and a fourth mixer in cascade, and a reference sweeping local oscillator connected to said third mixer and having a chirp slope equal to that of said second chirp filter means but of opposite sign, a fixed frequency local oscillator signal L0 connected to one input of said fourth mixer, and a bandpass filter connected to the output of said fourth mixer and to the input of said multiplier, said bandpass filter being tuned to the difference frequency of the two inputs of said fourth mixer.

3. The correlator of claim 1 wherein said multiplier is a bilinear multiplier capable of producing said product over a wide dynamic range of signals applied thereto.

4. The correlator of claim 1 wherein said chirp filters are surface acoustic wave devices of the reflective array compressor type.

5. The correlator of claim 1 wherein the bandwidth of said sweeping local oscillators is twice the maximum bandwidth of the signal S1 and wherein the chirp slope of said chirp filter means is equal in magnitude to the chirp slopes of said sweeping local oscillators but are of opposite sign thereto.

6. The correlator of claim 5 wherein said multiplier is a bilinear multiplier and said chirp filters are reflective array compressor type filters.

7. An asynchronous chirp transform correlator comprising means to obtain the Fourier transform of an unknown signal S1 to be correlated with a reference signal S2, said means including a pair of paralleled channels, each channel having a respective different linearly sweeping local oscillator and a mixer for modulating said signal S1 onto the respective local oscillator signal, said different local oscillator signals having the same center frequency and deviation but being interlaced in the timing of their sweeps so that any signal S1 of duration no more than one half the sweeping times of said sweeping local oscillators will fall completely within one or the other of the sweeps of said oscillators, and wherein said channels further include respective chirp filters for compressing the outputs of said mixer of that channel, and means for combining said reference signal S2 with the output of said chirp filters to provide an output which is the cross-correlation between said unknown and reference signals.

8. An asynchronous chirp transform correlator comprising first circuit means to obtain the Fourier transform of an unknown signal and second circuit means to obtain the complex conjugate of the Fourier transform of a reference signal to be correlated with said unknown signal, said first circuit means including a pair of channels each having mixer means and a linearly sweeping local oscillator connected thereto to modulate said unknown signal with respective signals from said local oscillators providing linearly frequency modulated signals having interlaced timing, and chirp filter means connected to said mixers to compress said sweeping signals, multiplier means having an input connected to said chirp filter means, means to apply said complex conjugate to the second input of said multiplier, and bandpass filter means connected to the output of said multiplier to filter out incompletely transformed signals from one or the other of said channels, and an inverse Fourier transform circuit connected to the output of said bandpass filter to provide an output which is the cross-correlation between said unknown and reference signals.

9. The correlator of claim 8 wherein said chirp filter means comprises a single reflective array compressor dispersive filter to which said sweeping linearly frequency modulated signals are applied.

10. The correlator of claim 8 wherein said inverse Fourier transform circuit includes third mixer means, second chirp filter means connected to the output of said third mixer means, fourth mixer means connected to the output of said second chirp filter means to provide said cross-correlation output, and a third sweeping local oscillator connected to said third and fourth mixer means.

11. The correlator of claim 10 wherein said means to apply said complex conjugate to the second input of said multiplier includes a fifth mixer means, a fourth sweeping local oscillator connected to said fifth mixer means, a third chirp filter means connected to said fifth mixer means, a sixth mixer means connected to said third chirp filter means, a fixed frequency local oscillator connected to said sixth mixer means, and a second bandpass filter means connected between said sixth mixer means and said second input of said multiplier.

* * * * *